United States Patent
Imamura et al.

(10) Patent No.: US 12,054,566 B2
(45) Date of Patent: Aug. 6, 2024

(54) MOLDED ARTICLE AND PRODUCTION METHOD THEREFOR

(71) Applicant: DAIKIN INDUSTRIES, LTD., Osaka (JP)

(72) Inventors: Hitoshi Imamura, Osaka (JP); Eri Mukai, Osaka (JP); Yuuki Kuwajima, Osaka (JP); Masahiro Kondo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 630 days.

(21) Appl. No.: 17/255,343

(22) PCT Filed: Jun. 14, 2019

(86) PCT No.: PCT/JP2019/023733
§ 371 (c)(1),
(2) Date: Dec. 22, 2020

(87) PCT Pub. No.: WO2020/004083
PCT Pub. Date: Jan. 2, 2020

(65) Prior Publication Data
US 2021/0269568 A1 Sep. 2, 2021

(30) Foreign Application Priority Data

Jun. 26, 2018 (JP) .................................. 2018-120591
Apr. 16, 2019 (JP) .................................. 2019-077862

(51) Int. Cl.
*C08F 214/26* (2006.01)
*B29C 48/00* (2019.01)
(Continued)

(52) U.S. Cl.
CPC ........ *C08F 214/262* (2013.01); *B29C 48/022* (2019.02); *B29C 48/09* (2019.02);
(Continued)

(58) Field of Classification Search
CPC . B29C 2059/145; B29C 48/022; B29C 48/09; B29C 48/92; B29C 59/14;
(Continued)

(56) References Cited

U.S. PATENT DOCUMENTS

2007/0228617 A1* 10/2007 Higashi .................... C08J 7/123
264/483
2014/0257450 A1 9/2014 Jung et al.
(Continued)

FOREIGN PATENT DOCUMENTS

JP 06-220231 A 8/1994
JP 07-292200 A 11/1995
(Continued)

OTHER PUBLICATIONS

Extended European Search Report dated Feb. 3, 2022 from the European Patent Office in corresponding EP Application No. 19826907.8.
(Continued)

*Primary Examiner* — Yan Lan
(74) *Attorney, Agent, or Firm* — Sughrue Mion, PLLC

(57) ABSTRACT

A molded article containing a copolymer including a tetrafluoroethylene unit and a perfluoro(alkyl vinyl ether) unit, wherein a surface roughness Ra of the molded article is 0.20

(Continued)

µm or less, and a water contact angle of the molded article is 80 degrees or less. Also disclosed is a method for producing the molded article.

13 Claims, 1 Drawing Sheet

(51) Int. Cl.
| | |
|---|---|
| *B29C 48/09* | (2019.01) |
| *B29C 71/04* | (2006.01) |
| *C08J 7/02* | (2006.01) |
| *C08J 7/12* | (2006.01) |
| *B29K 27/18* | (2006.01) |
| *B29K 105/00* | (2006.01) |

(52) U.S. Cl.
CPC ............... *B29C 71/04* (2013.01); *C08J 7/02* (2013.01); *C08J 7/123* (2013.01); *B29K 2027/18* (2013.01); *B29K 2105/0085* (2013.01); *C08J 2327/18* (2013.01); *C08J 2329/10* (2013.01); *C08J 2427/18* (2013.01); *C08J 2429/10* (2013.01)

(58) Field of Classification Search
CPC ............ B29C 71/04; B29K 2027/18; B29K 2105/0085; B29K 2995/0072; C08F 214/262; C08J 2327/18; C08J 2329/10; C08J 2427/18; C08J 2429/10; C08J 7/02; C08J 7/123
See application file for complete search history.

(56) References Cited

U.S. PATENT DOCUMENTS

| | | |
|---|---|---|
| 2017/0225436 A1 | 8/2017 | Takahashi et al. |
| 2017/0282469 A1 | 10/2017 | Yamamura et al. |
| 2018/0174708 A1 | 6/2018 | Simpson et al. |
| 2019/0202151 A1 | 7/2019 | Imamura et al. |

FOREIGN PATENT DOCUMENTS

| | | |
|---|---|---|
| JP | 08-047669 A | 2/1996 |
| JP | 10-030761 A | 2/1998 |
| JP | 2001-088816 A | 4/2001 |
| JP | 2002-20514 A | 1/2002 |
| JP | 2005-149892 A | 6/2005 |
| JP | 4879186 B2 | 2/2012 |
| JP | 2015-138755 A | 7/2015 |
| JP | 2016-037597 A | 3/2016 |
| JP | 2016-056363 A | 4/2016 |
| JP | 2018-028082 A | 2/2018 |
| TW | 201821249 A | 6/2018 |
| WO | 2018/034238 A1 | 2/2018 |

OTHER PUBLICATIONS

International Search Report for PCT/JP2019/023733 dated Sep. 17, 2019 [PCT/ISA/210].
International Preliminary Report on Patentability with a Translation of the Written Opinion of the International Searching Authority dated Dec. 29, 2020 in Application No. PCT/JP2019/023733.

\* cited by examiner

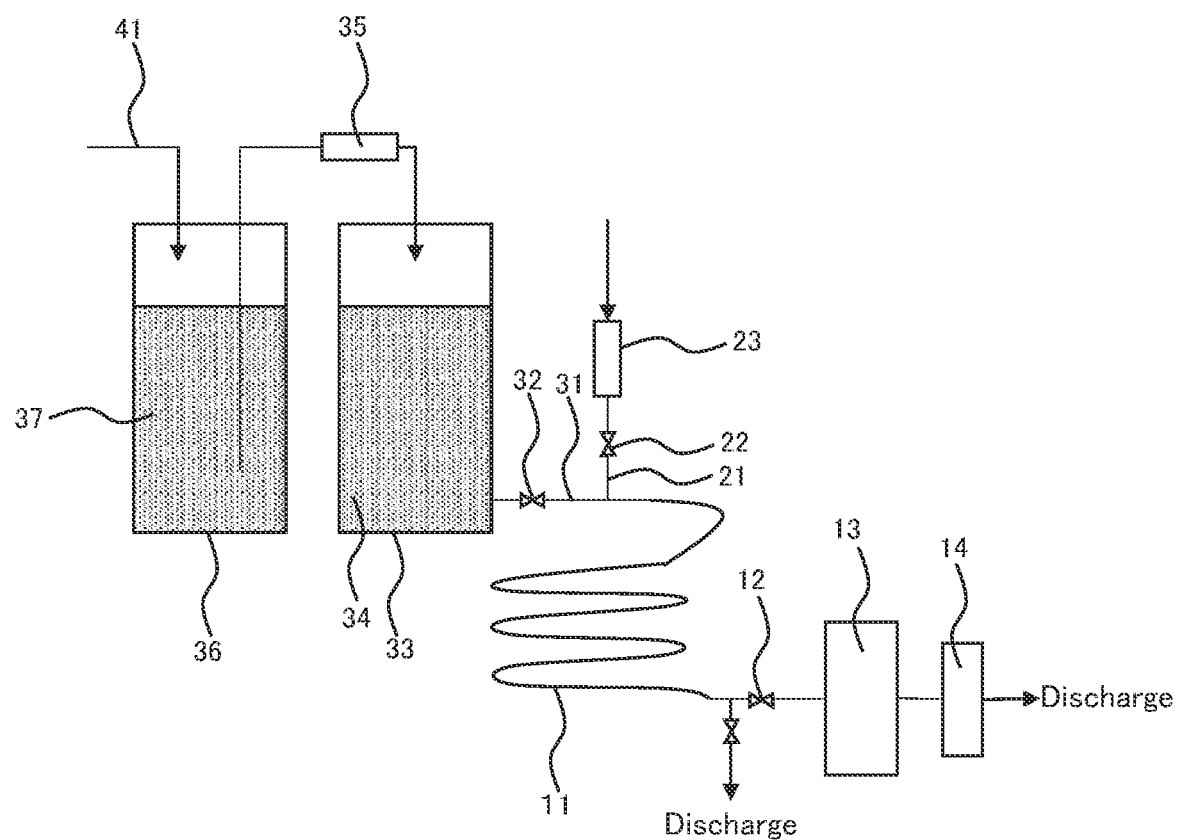

MOLDED ARTICLE AND PRODUCTION METHOD THEREFOR

CROSS REFERENCE TO RELATED APPLICATIONS

This application is a National Stage of International Application No. PCT/JP2019/023733 filed Jun. 14, 2019, claiming priority based on Japanese Patent Application Nos. 2018-120591 filed Jun. 26, 2018 and 2019-077862 filed Apr. 16, 2019.

TECHNICAL FIELD

The present disclosure relates to a molded article and a production method therefor.

BACKGROUND ART

Patent Document 1 proposes a method for producing a surface-modified molded product, comprising raising a surface temperature of a molded product containing an organic polymer compound to a temperature of (the melting point of the organic polymer compound−120°) C or higher and performing atmospheric pressure plasma treatment on the surface of the molded product to introduce a peroxide radical.

RELATED ART

Patent Document

Patent Document 1: Japanese Patent Laid-Open No. 2016-056363

SUMMARY OF THE INVENTION

Problem to be Solved by the Invention

An object of the present disclosure is to provide a molded article, the surface of which can be easily cleaned and from which particles are unlikely generated.

Another object of the present disclosure is to provide a production method capable of producing a molded article, wherein a surface having a small water contact angle can be formed without significantly increasing the surface roughness, and the small water contact angle is maintained for a long period of time.

Means for Solving the Problem

The present disclosure provides a molded article comprising a copolymer containing a tetrafluoroethylene unit and a perfluoro(alkyl vinyl ether) unit, wherein a surface roughness Ra of the molded article is 0.20 μm or less, and a water contact angle of the molded article is 80 degrees or less.

The content of the perfluoro(alkyl vinyl ether) unit of the copolymer is preferably 3.5 to 7.0% by mass based on all monomer units.

The melt flow rate of the copolymer at 372° C. is preferably 1 to 30 g/10 min.

The molded article of the present disclosure is preferably a tube, and is preferably a tube through which a chemical liquid is passed, wherein the surface roughness Ra of a wetted surface is 0.20 μm or less, and the water contact angle of the wetted surface is 80 degrees or less.

Also, the present disclosure provides a method for producing a molded article comprising a copolymer containing a tetrafluoroethylene unit and a perfluoro(alkyl vinyl ether) unit, the method comprising performing plasma treatment for a treatment time of 50 seconds or less on the molded article heated to a surface temperature of 150° C. or higher.

The plasma treatment is preferably atmospheric pressure plasma treatment.

In the production method of the present disclosure, the content of the perfluoro(alkyl vinyl ether) unit of the copolymer is preferably 3.5 to 7.0% by mass based on all monomer units.

In the production method of the present disclosure, the melt flow rate of the copolymer at 372° C. is preferably 1 to 30 g/10 min.

The production method of the present disclosure preferably further comprises obtaining the molded article by extrusion.

In the production method of the present disclosure, the molded article is preferably a tube.

The production method of the present disclosure preferably further comprises washing the molded article obtained by the plasma treatment with water.

Also, the present disclosure provides a method for washing a molded article, comprising washing the above-described molded article with water.

Effects of Invention

The present disclosure can provide a molded article, the surface of which can be easily cleaned and from which particles are unlikely generated.

Also, the present disclosure can provide a production method capable of producing a molded article, wherein a surface having a small water contact angle can be formed without significantly increasing the surface roughness, and the small water contact angle is maintained for a long period of time.

BRIEF DESCRIPTION OF DRAWINGS

The FIGURE is a drawing for explaining a method for measuring the number of particles.

DESCRIPTION OF EMBODIMENTS

Below, specific embodiments of the present disclosure will now be described in detail, but the present disclosure is not limited to the following embodiments.

The molded article of the present disclosure is a molded article containing a copolymer (hereinafter referred to as a TFE/PAVE copolymer (or PFA)) containing a tetrafluoroethylene unit (a TFE unit) and a perfluoro(alkyl vinyl ether) unit (a PAVE unit), wherein the surface roughness Ra is 0.20 μm or less, and the water contact angle is 80 degrees or less.

With the progress of a process for reducing the semiconductor size, it is important to reduce contaminants from molded articles used in semiconductor apparatuses and chemical liquid supplying facilities. Molded articles containing a TFE/PAVE copolymer have excellent chemical liquid resistance and the like, and are therefore widely used in semiconductor apparatuses and chemical liquid supplying facilities, and the area that is brought into contact with a high-purity chemical liquid is also large. However, the water contact angle of molded articles containing a TFE/PAVE copolymer exceeds 100 degrees, and thus there is the problem that the molded articles unlikely become wet and, in addition, bubbles (microbubbles) attached to the surface of the molded articles such as a tube are unlikely removed. Accordingly, there is the problem that a large amount of a chemical liquid is required for washing, which is called flushing, or washing for a long period of time is required. Although a method is known in which a surfactant is added or an alcohol is added to washing water used in washing molded articles to wet the molded article, the surfactant and the alcohol are problematic by causing contamination when washing transfer pipes for high-purity chemical liquids used in semiconductor plants and components used in semiconductor manufacturing apparatuses.

A known method for modifying the surface of a molded article is a method comprising performing atmospheric pressure plasma treatment on the surface of a molded article as described in Patent Document 1. However, performing atmospheric pressure plasma treatment on a molded article containing a TFE/PAVE copolymer under conventional conditions is problematic in that the surface roughness of the molded article is increased, and particles are likely generated from the molded article. Accordingly, as described in Patent Document 1, the treatment conditions of conventional atmospheric pressure plasma treatment are optimized mostly for increasing adhesion to other materials.

Moreover, the TFE/PAVE copolymer is usually melt-molded at a high temperature of 350° C. or higher. Low molecular weight components volatilize during high-temperature melt molding, and may be reaggregated by being cooled after molding, and attached to the surface of a molded article as particles. Moreover, when producing a tube or a joint as a molded article, a molded article obtained by melt-molding is further thermally melted for welding or bending, and is thus exposed to high temperatures many times until molding is finally completed. Accordingly, volatilized low molecular weight components are often attached to the molded article thus obtained. In addition to volatile low molecular weight components, substances derived from plasticizers present in the molding atmosphere, carbons, PM2.5, and yellow sand floating in air, and the like may also be attached to the surface of the molded article.

In particular, when particles derived from the TFE/PAVE copolymer are attached to the molded article, the particles and the molded article strongly adhere to each other due to the hydrophobic interaction therebetween, and thus the particles cannot be easily removed by being washed with water. However, the use of an organic solvent such as a fluorine solvent to remove particles increases environmental load and workers' burden.

The molded article of the present disclosure is a molded article comprising a copolymer containing a tetrafluoroethylene unit and a perfluoro(alkyl vinyl ether) unit, wherein, as described above, the surface roughness is small and the water contact angle is small, and therefore the surface can be easily cleaned, and particles are unlikely generated. Moreover, the small water contact angle is maintained over a long period of time. The surface of the molded article of the present disclosure can be sufficiently cleaned even when water is solely used without using a chemical liquid. The present disclosure includes a method for washing a molded article, the method comprising washing the molded article of the present disclosure with water.

The surface roughness Ra of the molded article of the present disclosure is 0.20 μm or less and, because generation of particles can be further suppressed, is preferably 0.18 μm or less and more preferably 0.16 μm or less, and although the lower limit is not limited, the surface roughness Ra is preferably 0.01 μm or more from the viewpoint of the ease of production. The surface roughness Ra may be the surface roughness Ra of a part of the molded article of the present disclosure, and may be the surface roughness Ra of a wetted surface when the molded article of the present disclosure used is in contact with a chemical liquid.

In the present disclosure, the surface roughness Ra is measured in accordance with JIS B 0601-1994.

The water contact angle of the molded article of the present disclosure is 80 degrees or less and, because surface washing can be more facilitated, is preferably 70 degrees or less and more preferably 60 degrees or less, and although the lower limit is not limited, the water contact angle is preferably 40 degrees or more from the viewpoint of the ease of production. The water contact angle may be the water contact angle of a part of the molded article of the present disclosure, and may be the water contact angle of a wetted surface when the molded article of the present disclosure used is in contact with a chemical liquid.

In the present disclosure, the water contact angle is measured with a contact angle meter.

The water contact angle of the molded article of the present disclosure can be 80 degrees or less even 73 days after plasma treatment. Thus, the molded article of the present disclosure can also maintain a low water contact angle for a long period of time. The water contact angle 73 days after plasma treatment is preferably 70 degrees or less and more preferably 60 degrees or less, and although the lower limit is not limited, the water contact angle is preferably 40 degrees or more from the viewpoint of the ease of production.

Because the ease of washing can be maintained for a long period of time and generation of particles can be suppressed for a long period of time, the hardness of the molded article of the present disclosure is preferably 91 MPa or more, more preferably 94 MPa or more, and even more preferably 101 MPa or more, and although the upper limit is not limited, the hardness is preferably 150 MPa or less from the viewpoint of the ease of production.

Herein, hardness refers to surface indentation hardness (Hardness, unit: $N/mm^2$ (Pa)), and can be measured with a nanoindentation tester.

The molded article of the present disclosure comprises a copolymer (hereinafter referred to as a TFE/PAVE copolymer (or PFA)) containing a tetrafluoroethylene unit (a TFE unit) and a perfluoro(alkyl vinyl ether) unit (a PAVE unit).

The TFE/PAVE copolymer is preferably a melt-fabricable fluororesin. In the present disclosure, melt-fabricable means that the polymer can be melted and processed by using a conventional processing device such as an extruder or an injection molding machine. Accordingly, the melt-fabricable fluororesin usually has a melt flow rate of 0.01 to 500 g/10 min as measured by the measuring method described below.

The content of a monomer unit based on PAVE in the TFE/PAVE copolymer is preferably 1.0 to 10% by mass, and is more preferably 2.0% by mass or more, even more preferably 3.5% by mass or more, particularly preferably 4.0% by mass or more, and most preferably 5.0% by mass or more, and more preferably 8.0% by mass or less, even more preferably 7.0% by mass or less, particularly preferably 6.5% by mass or less, and most preferably 6.0% by mass or less, based on all monomer units. The amount of a monomer unit based on PAVE is measured by $^{19}$F-NMR method.

Herein, perfluoro(alkyl vinyl ether) (PAVE) may be fluoroalkyl vinyl ether in which some hydrogen atoms are replaced with fluorine atoms or may be perfluoro(alkyl vinyl ether) in which all hydrogen atoms are replaced with fluorine atoms, and is preferably perfluoro(alkyl vinyl ether) in which all hydrogen atoms are replaced with fluorine atoms. Herein, perfluoro(alkyl vinyl ether) in which all hydrogen atoms are replaced with fluorine atoms is alkyl vinyl ether that does not contain a C—H bond.

PAVE constituting the PAVE unit may be at least one selected from the group consisting of a monomer represented by general formula (1):

$$CF_2=CFO(CF_2CFY^1O)_p\text{—}(CF_2CF_2CF_2O)_q\text{—}R^f \quad (1)$$

(wherein $Y^1$ represents F or $CF_3$, $R^f$ represents a perfluoroalkyl group having 1 to 5 carbon atoms, p represents an integer of 0 to 5, and q represents an integer of 0 to 5) and a monomer represented by general formula (2):

$$CFX=CXOCF_2OR^1 \quad (2)$$

(wherein X is the same or different and represents H, F, or $CF_3$, and $R^1$ is a linear or branched fluoroalkyl group having 1 to 6 carbon atoms and optionally containing 1 to 2 atoms of at least one selected from the group consisting of H, Cl, Br, and I, or is a cyclic fluoroalkyl group having 5 or 6 carbon atoms and optionally containing 1 to 2 atoms of at least one selected from the group consisting of H, Cl, Br, and I).

Among them, PAVE is preferably a monomer represented by general formula (1), more preferably at least one selected from the group consisting of perfluoro(methyl vinyl ether), perfluoro(ethyl vinyl ether), and perfluoro(propyl vinyl ether) (PPVE), and even more preferably PPVE.

The TFE/PAVE copolymer is not limited, and is preferably a copolymer having a molar ratio of a TFE unit to a PAVE unit (a TFE unit/a PAVE unit) of 70/30 or more and less than 99/1. A more preferable molar ratio is 70/30 or more and 98.9/1.1 or less, and an even more preferable molar ratio is 80/20 or more and 98.9/1.1 or less. When the ratio of a TFE unit is excessively small, the mechanical properties tend to be impaired, and when excessively large, the melting point is excessively high, and moldability tends to be impaired.

The TFE/PAVE copolymer is also preferably a copolymer composed solely of a TFE unit and a PAVE unit or a copolymer in which a monomer unit derived from a monomer copolymerizable with TFE and PAVE is 0.1 to 10 mol %, and the TFE unit and the PAVE unit are 90 to 99.9 mol % in total.

Examples of the monomer copolymerizable with TFE and PAVE include HFP, a vinyl monomer represented by $CZ^3Z^4=CZ^5(CF_2)nZ^6$ (wherein $Z^3$, $Z^4$, and $Z^5$ are the same or different and represent H or F, $Z^6$ represents H, F, or Cl, and n represents an integer of 2 to 10), and an alkyl perfluorovinyl ether derivative represented by $CF_2=CF\text{—}OCH_2\text{—}Rf^7$ (wherein $Rf^7$ represents a perfluoroalkyl group having 1 to 5 carbon atoms). Among them, HFP is preferable.

The TFE/PAVE copolymer is preferably at least one selected from the group consisting of a copolymer composed solely of a TFE unit and a PAVE unit and the above-described TFE/HFP/PAVE copolymer, and is more preferably a copolymer composed solely of a TFE unit and a PAVE unit.

The melting point of the TFE/PAVE copolymer is preferably 280 to 322° C., and is more preferably 290° C. or higher and more preferably 315° C. or lower. The melting point can be measured with a differential scanning calorimeter (DSC).

The glass transition temperature (Tg) of the TFE/PAVE copolymer is preferably 70 to 110° C., and is more preferably 80° C. or higher and more preferably 100° C. or lower. The glass transition temperature can be measured by dynamic viscoelasticity measurement.

The melt flow rate (MFR) of the TFE/PAVE copolymer at 372° C. is preferably 0.1 to 100 g/10 min, and is more preferably 0.5 g/10 min or more, and even more preferably 1 g/10 min, and is more preferably 80 g/10 min or less, even more preferably 60 g/10 min or less, particularly preferably 40 g/10 min or less, and most preferably 30 g/10 min or less. MFR is a value obtained as the mass (g/10 min) of a polymer flowing out from a nozzle having an inner diameter of 2.1 mm and a length of 8 mm at 372° C. at a load of 5 kg in 10 minutes in accordance with ASTM D 1238 using a melt indexer (manufactured by Yasuda Seiki Seisakusho Ltd.).

The TFE/PAVE copolymer preferably has 0 to 1000 functional groups in total per $10^6$ carbon atoms because molding defects resulting from foaming resulting from thermal decomposition of functional groups unlikely occur, the surface can be more easily washed, and particle-derived substances are unlikely generated. The number of functional groups is more preferably 0 to 700 per $10^6$ carbon atoms, more preferably 500 or less, and even more preferably 300 or less.

The functional group is a functional group that is present at a main chain terminal or a side chain terminal of the TFE/PAVE copolymer, and a functional group that is present in the main chain or in a side chain. The functional group is preferably at least one selected from the group consisting of —CF=CF$_2$, —CF$_2$H, —COF, —COOH, —COOCH$_3$, —CONH$_2$, and —CH$_2$OH.

Infrared spectroscopy can be used to identify the kind of functional group and measure the number of functional groups.

Specifically, the number of functional groups is measured by the following method. First, the TFE/PAVE copolymer is melted at 330 to 340° C. for 30 minutes and compression-molded to create a film having a thickness of 0.25 to 0.3 mm. This film is analyzed by Fourier transform infrared spectroscopy to obtain the infrared absorption spectrum of the TFE/PAVE copolymer and obtain a spectral difference from a base spectrum of a completely fluorinated copolymer having no functional group. From the absorption peak of a specific functional group appearing in the spectral difference, the number N of functional groups per $1 \times 10^6$ carbon atoms in the TFE/PAVE copolymer is calculated according to the following formula (A).

$$N = I \times K / t \quad (A)$$

I: Absorbance
K: Correction coefficient
t: Film thickness (mm)

For reference, Table 1 shows the absorption frequencies, molar absorption coefficients, and correction coefficients of functional groups in the present disclosure. The molar adsorption coefficients are determined from the FT-IR measurement data of a low molecular weight model compound.

[Table 1]

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF═CF$_2$ | 1795 | 635 | 366 | $CF_2$═$CF_2$ |

The absorption frequencies of —CH$_2$CF$_2$H, —CH$_2$COF, —CH$_2$COOH, —CH$_2$COOCH$_3$, and —CH$_2$CONH$_2$ are smaller by several tens of Kaisers ($cm^{-1}$) than the absorption frequencies of —CF$_2$H, —COF, —COOH free and —COOH bonded, —COOCH$_3$, and —CONH$_2$ shown in the table, respectively.

Accordingly, for example, the number of —COF functional groups is the sum of the number of functional groups obtained from the absorption peak at an absorption frequency of 1883 $cm^{-1}$ derived from —CF$_2$COF and the number of functional groups obtained from the absorption peak at an absorption frequency of 1840 $cm^{-1}$ derived from —CH$_2$COF.

The number of functional groups may be the total number of —CF═CF$_2$, —CF$_2$H, —COF, —COOH, —COOCH$_3$, —CONH$_2$, and —CH$_2$OH.

The functional group is introduced into the TFE/PAVE copolymer by, for example, a chain transfer agent or a polymerization initiator used when producing the TFE/PAVE copolymer. For example, when alcohol is used as a chain transfer agent, or when a peroxide having a —CH$_2$OH structure is used as a polymerization initiator, —CH$_2$OH is introduced into a main chain terminal of the TFE/PAVE copolymer. By polymerizing a monomer having a functional group, the functional group is introduced into a side chain terminal of the TFE/PAVE copolymer.

The TFE/PAVE copolymer can be produced by, for example, a conventionally known method in which monomers that are the constituent units thereof and additives such as a polymerization initiator are suitably mixed, and emulsion polymerization or suspension polymerization is performed.

The molded article of the present disclosure may comprise other components as necessary. Examples of other components include additives such as cross-linking agents, antistatic agents, heat stabilizers, foaming agents, foam nucleating agents, antioxidants, surfactants, photopolymerization initiators, wear preventing agents, and surface modifiers.

The molded article of the present disclosure can be suitably produced by the molded article production method described below.

The molded article production method of the present disclosure is a method for producing a molded article comprising a copolymer (a TFE/PAVE copolymer) containing a TFE unit and a PAVE unit, the method comprising performing plasma treatment for a treatment time of 50 seconds or less on the molded article heated to a surface temperature of 150° C. or higher. Having such a feature, the molded article production method of the present disclosure is capable of forming a surface having a small water contact angle without significantly increasing the surface roughness, and is capable of producing a molded article with which the small contact angle is maintained for a long period of time. Accordingly, concerning the molded article obtained by the production method of the present disclosure, the surface can be easily cleaned, and particles are unlikely generated.

In the production method of the present disclosure, the use of the TFE/PAVE copolymer provides the effect that not only the water contact angle of the obtained molded article can be sufficiently lowered, but also the small water contact angle of the molded article can be maintained for a long period of time. Although the reason therefor is not clear, it is considered that the plasma treatment not only produces a hydrophilic functional group on the surface of the molded article, but also crosslinks polymer molecules present in the vicinity of the surface and anchors the produced hydrophilic functional group to the surface of the molded article. Usually a polar functional group produced on the surface has a greater surface free energy than bulk or air (because, although the dispersion force component is decreased, the dipole force component and the hydrogen bond component are increased, and the total is increased), and is more stable in terms of surface free energy when submerged inside the molded article, and it is thus considered that a molecular motion called internal inversion of the polar group occurs. In particular, in the case of a semi-crystalline polymer such as the TFE/PAVE copolymer, when crystallinity is low, the polymer chain in the non-crystalline portion is loose and likely has molecular motion, and thus internal inversion also likely occurs. It is inferred that in the production method of the present disclosure, by using the TFE/PAVE copolymer and adopting specific plasma treatment conditions, polymer molecules on the surface are crosslinked, the molecular motion of a hydrophilic functional group produced on the surface is suppressed, and thus the small water contact angle is retained for a long period of time.

Thus, the molded article obtained by the production method of the present disclosure retains a small water contact angle for a long period of time. Accordingly, when contaminants such as particles are attached to the surface of the molded article, the contaminants can be easily removed by being washed with water even after a certain period of time has elapsed from production of the molded article as long as the small water contact angle is retained.

It is also inferred that when particulate contaminants are attached to the molded article before plasma treatment, by using the production method of the present disclosure, plasma treatment is also performed on the contaminants, and the water contact angle of the contaminants is also reduced. Although it is not easy to remove contaminants from the molded articles especially when the contaminants are hydrophobic, by using the production method of the present disclosure, affinity between the contaminants and water is increased, thus facilitating the washing with water. Examples of contaminants include particles derived from the TFE/PAVE copolymer, components derived from a plasticizer present in the molding atmosphere, and carbons, PM2.5, and yellow sand floating in air. In addition, fine particles such as oil mist are also relatively low molecular weight substances, and can be removed as carbon dioxide by being decomposed by plasma.

On the other hand, it is inferred that when other perfluoropolymers that do not contain a PAVE unit, such as polytetrafluoroethylene (PTFE) and a TFE/HFP copolymer (FEP), are used, although they are similarly perfluoropolymers, the crosslinking of polymer molecules does not proceed smoothly, and a hydrophilic functional group, even when generated, disappears promptly.

The TFE/PAVE copolymer for use in the production method of the present disclosure may be the same copolymer as the TFE/PAVE copolymer contained in the molded article of the present disclosure, and the same copolymer as the TFE/PAVE copolymer contained in the molded article of the present disclosure is suitable.

In order to form a surface having a smaller water contact angle while further suppressing an increase of surface roughness and maintain the small water contact angle for a longer period of time, a TFE/PAVE copolymer having a specific content of a PAVE unit is preferably used. The content of a PAVE-based monomer unit in the TFE/PAVE copolymer is preferably 1.0 to 10% by mass, and is more preferably 2.0% by mass or more, even more preferably 3.5% by mass or more, particularly preferably 4.0% by mass or more, and most preferably 5.0% by mass or more, and is more preferably 8.0% by mass or less, even more preferably 7.0% by mass or less, particularly preferably 6.5% by mass or less, and most preferably 6.0% by mass or less, based on all monomer units.

In order to form a surface having a smaller water contact angle while further suppressing an increase of surface roughness and maintain the small water contact angle for a longer period of time, a TFE/PAVE copolymer having a functional group is preferably used. It is inferred that by using a TFE/PAVE copolymer having a functional group, introduction of a hydrophilic functional group and a crosslinking reaction by the plasma treatment proceed smoothly.

It is also inferred that by introducing a hydrophilic functional group and crosslinking polymer molecules present in the vicinity of the surface of the molded article, the hydrophilic functional group can be maintained for a long period of time. In this case, the number of functional groups is preferably 1 or more.

A functional group that the TFE/PAVE copolymer for use in the production method of the present disclosure may have may be the same functional group as that of the TFE/PAVE copolymer contained in the molded article of the present disclosure, and the same functional group as that of the TFE/PAVE copolymer contained in the molded article of the present disclosure is suitable. Also, the number of functional groups may be the same as the number of functional groups in the TFE/PAVE copolymer contained in the molded article of the present disclosure.

The plasma treatment in the production method of the present disclosure can be performed by applying a voltage across discharge electrodes while introducing gas into the gap between the molded article and the discharge electrodes, and subjecting the surface of the molded article to plasma irradiation treatment by plasma gas generated between the molded article and the discharge electrodes.

As for the plasma treatment in the production method of the present disclosure, vacuum plasma treatment or atmospheric pressure plasma treatment is preferable because an increase of surface roughness can be further suppressed, and atmospheric pressure plasma treatment is more preferable because it can be conveniently performed in a short period of time at normal pressure, the discharge state is highly stable and homogeneous, and the spatial uniformity of a generated radical is high.

In the production method of the present disclosure, the plasma treatment is completed in a range of 50 seconds or less. In the production method of the present disclosure, such a short-time treatment is required because a surface having a small water contact angle needs to be formed without significantly increasing the surface roughness. Conventional plasma treatments are performed to improve adhesion to other materials, and such a short-time treatment is not employed.

The treatment time of the plasma treatment is preferably 5 seconds or more because a surface having a smaller water contact angle can be formed, and, because a surface having a smaller water contact angle can be formed without significantly increasing the surface roughness, is preferably less than 50 seconds, more preferably 45 seconds or less, even more preferably 40 seconds or less, further preferably 35 seconds or less, particularly preferably 30 seconds or less, and most preferably 25 seconds or less. The plasma treatment may be repeatedly performed multiple times on the molded article, or may be performed by causing the molded article to travel through a plasma irradiation region. In these cases, the treatment time of the plasma treatment is a cumulative value of the time when any part of the molded article is irradiated with plasma.

In the production method of the present disclosure, the plasma treatment is performed on the molded article heated to a surface temperature of 150° C. or higher. Herein, the surface temperature during the plasma treatment refers to the maximum temperature of the surface of the molded article during plasma irradiation. When the surface temperature during the plasma treatment is excessively low, the contact angle of the obtained molded article cannot be sufficiently lowered, or the molecular mobility of polymer molecules present in the vicinity of the surface of the molded article cannot be sufficiently increased, thus the crosslinking reaction of polymer molecules in the vicinity of the surface cannot be promoted, and, accordingly, the small water contact angle of the molded article cannot be maintained for a long period of time.

In the production method of the present disclosure, the surface temperature of the molded article can be measured with a thermolabel manufactured by NiGK Corporation.

The upper limit of the surface temperature during the plasma treatment is preferably the melting point of the TFE/PAVE copolymer or lower from the viewpoint of suppressing thermal deformation of the molded article. The surface temperature during the plasma treatment is preferably 155° C. or higher and preferably lower than the melting point, more preferably 280° C. or lower, and even more preferably 240° C. or lower. When the surface temperature during the plasma treatment is excessively high, the surface roughness may be excessive.

Since PTFE is not melt-fabricable, the shape of the molded article does not significantly change even when the surface is heated to a very high temperature. Accordingly, by taking advantage of this characteristic of PTFE, only the surface is suitably melted and can be smoothed by heating the surface to a very high temperature, for example, when performing plasma treatment on a PTFE molded article having surface irregularities. On the other hand, since the TFE/PAVE copolymer is usually melt-fabricable, the shape of the molded article may be impaired when the surface temperature during the plasma treatment is very high.

The method for controlling the surface temperature during the plasma treatment is not limited, and examples include a method involving controlling the temperature by plasma treatment conditions and a method involving controlling the temperature by an external heating facility. For example, when atmospheric pressure plasma treatment is used, the temperature can be spontaneously increased to a desired temperature range by adjusting the power density and the treatment time. When the molded article of the TFE/PAVE copolymer is subjected to atmospheric pressure plasma treatment for an excessively long period of time, the temperature is spontaneously increased to a temperature above the melting point, and the shape of the molded article may be impaired. Also, when pulse frequency modulation is used or vacuum plasma treatment is used, the surface temperature of the molded article is unlikely increased by the plasma treatment, and it is thus suitable to use a method involving performing the plasma treatment after increasing the surface temperature of the molded article to 140 to 240° C. by using an external heating facility, a method involving providing a heating means in a plasma treatment apparatus to perform heating, or the like. Examples of the heating means include a thermal heater, a heating-plate heater including an electric heating coil, and a halogen lamp.

The structure of electrodes used in the plasma treatment is not limited, and a structure suitable for the shape of the molded article is preferable. The material of the high-voltage-side electrode and the ground-side electrode is not limited as long as it is a conductive material, examples in the case of metal include alloys such as stainless steel, brass, carbon steel and super steel as well as copper and aluminum, and these can be used singly or as a suitable combination. Alternatively, a material can be used that is obtained by coating the surface of non-conductive plastic, ceramic, or the like with copper, gold, a metal-oxide transparent conductive material, or the like for conductive treatment.

A reactive gas, or a mixed gas of a reactive gas and an excitation gas, can be used in the plasma treatment. Examples of the reactive gas include air, hydrogen, oxygen, ammonia, water vapor, and methane. Examples of the excitation gas include argon, helium, and nitrogen. Examples of the mixed gas include a mixed gas of oxygen gas and argon gas, and a mixed gas of oxygen gas and nitrogen gas. The volume ratio of reactive gas to excitation gas (reactive gas/excitation gas) may be in the range of 0.5/100 to 1.5/100. The oxygen concentration in the gas used may be in the range of 0.0005 to 0.3% by volume.

In particular, when oxygen gas is used, it can be expected that a hydrophilic functional group is generated on the surface of the molded article, and the water contact angle is sufficiently lowered. However, when the amount of oxygen based on that of the excitation gas such as helium gas or argon gas is excessive, the amount of power for maintaining discharge may be increased. A large amount of power may damage the surface of the molded article, increase surface roughness, and also increase the water contact angle. Accordingly, when using a mixed gas of oxygen gas and excitation gas in the plasma treatment, the volume ratio of oxygen gas to excitation gas (oxygen gas/excitation gas) is preferably in the range of 0.5/100 to 1.5/100.

It has been elucidated by emission spectrometry that helium gas as excitation gas is excited to a high energy level in plasma. Thus, activated He and O2 react, a process gas such as oxygen is efficiently dissociated, and atomic oxygen can be easily generated (the penning effect).

The plasma treatment may be performed in a batch-wise manner, or in a continuous manner such as a treatment involving a conveyor mechanism.

Next, the treatment conditions when atmospheric pressure plasma treatment is used will now be described. Examples of the reaction apparatus used in the atmospheric pressure plasma treatment include a flow tube type reaction apparatus involving external electrodes and a bell jar type reaction apparatus involving internal electrodes.

The voltage frequency of a high-frequency power source used in the atmospheric pressure plasma treatment is preferably 50 Hz to 2.45 GHz. Also, 13.56 MHz is recommended as a high frequency that stably generates a uniform plasma space. The power density per unit area of an electrode is usually 5 to 50 $W/cm^2$ and preferably 10 to 30 $W/cm^2$, and when the molded article is heated at a certain level of high voltage, there is a tendency that the crosslinking reaction of polymer molecules likely proceeds. The pressure during the atmospheric pressure plasma treatment may be in the range of 500 to 1300 hPa (375 to 975 torr).

The distance between the molded article and the electrodes used in the atmospheric pressure plasma treatment is preferably 0.5 to 5 mm and more preferably 1 to 5 mm because the desired effect is obtained even at a relatively low voltage, and excellent safety and economy are obtained as well.

The gas flow rate in the atmospheric pressure plasma treatment may be 50 to 500 cc/min (normal pressure), and more preferably 10 to 400 cc/min (normal pressure).

Next, treatment conditions when vacuum plasma treatment is used will now be described. The voltage frequency used in the vacuum plasma treatment is preferably 5 Hz to 15 MHz. The vacuum apparatus used in the vacuum plasma treatment is preferably a rotary pump because of its efficiency. The pressure during the vacuum plasma treatment is usually 0.01 to 10 Torr (1.3 to 1330 Pa) and preferably 0.1 to 2 Torr (13.3 to 266 Pa) because discharge is stable, and a sufficient treatment speed is obtained.

The gas flow rate in the vacuum plasma treatment may be 5 to 50 cc/min (normal pressure). The gas flow rate can be regulated by a needle valve. Other treatment conditions may be the same as preferable treatment conditions of the atmospheric pressure plasma treatment.

In the production method of the present disclosure, the plasma treatment is preferably performed such that the indentation hardness of the molded article after the plasma treatment is 1.2 times or more than the indentation hardness of the molded article before the plasma treatment. By performing the plasma treatment under such conditions, polymer molecules in the vicinity of the surface of the molded article are crosslinked, and the small water contact angle can be maintained for a longer period of time.

In the production method of the present disclosure, the plasma treatment is preferably performed such that the surface roughness Ra of the molded article after the plasma treatment is 2.0 times or less than the surface roughness Ra of the molded article before the plasma treatment. By performing the plasma treatment under such conditions, a molded article from which particles are less likely generated can be produced.

The production method of the present disclosure preferably further comprises obtaining the molded article by molding the TFE/PAVE copolymer. It is preferable that the step of obtaining the molded article is performed before the step of performing the plasma treatment.

The method for molding the TFE/PAVE copolymer may be a method in which the TFE/PAVE copolymer is melted by being heated to the melting point or higher, and then molded. The method for molding the TFE/PAVE copolymer is not limited, and examples include known methods such as extrusion, injection molding, transfer molding, inflation molding, and compression molding. These molding methods may be suitably selected according to the shape of the molded article to be obtained.

The method for molding the TFE/PAVE copolymer is preferably extrusion, compression molding, or injection molding, and more preferably extrusion. By using these molding methods, molded articles such as a tube, a film, and a bottle can be easily produced.

By comprising the step of obtaining a tube by extrusion before the step of performing plasma treatment, the production method of the present disclosure is capable of producing a tube as a molded article.

When subjecting the obtained tube to the plasma treatment, the tube extruded from an extruder may be directly supplied to a plasma treatment apparatus, or the tube obtained by extrusion may be wound on a reel and then supplied from the reel to a plasma treatment apparatus. Also, the tube obtained by extrusion may be cut to a desired length and then supplied to a plasma treatment apparatus.

As for the tube supplied to a plasma treatment apparatus, the inner surface of the tube can be subjected to plasma irradiation treatment by plasma gas generated between the inside of the tube and the discharge electrodes by applying a voltage across the discharge electrodes while introducing gas into the gap between the tube and the discharge electrodes.

The production method of the present disclosure preferably further comprises washing the molded article obtained by the plasma treatment with water. By washing the molded article obtained by the plasma treatment with water, particles attached to the surface of the molded article can be easily removed, and a molded article from which particles are less likely generated can be produced. As a reason therefor, it is inferred that the water contact angle of the particles is also reduced by the plasma treatment. Washing with water is preferably performed while the small water contact angle of the molded article after the plasma treatment is maintained.

Water for use in washing is preferably water from which particles are removed, and, for example, water in which the number of particles having a size of 30 nmφ or more is 30 particles/ml or less can be used.

Water for use in washing is also preferably water from which metal components are removed. The metal content in water is preferably 10 ppb or less, and more preferably 5 ppb or less, in terms of the total metal content of Fe, Cr, Ni, Cu, Al, Na, Mg, and K.

Water for use in washing is more preferably water from which particles and metal components are removed, and, for example, ultrapure water can be used.

In the step of washing the molded article with water, the molded article is preferably washed with running water (running-water washing) because a molded article, generation of particles from which is further suppressed, can be produced. When the molded article is washed by being immersed in pooled water (pooled-water washing), possibly a molded article, generation of particles from which is sufficiently suppressed, cannot be produced. Examples of the method for washing with running water include a method involving spraying water onto the molded article by using a shower or the like, a method involving immersing the molded article in a washing tank through which water is caused to flow at a desired flow rate, and, when the molded article is a molded article that has a flow channel such as a tube, a method involving causing water to flow through the channel.

The flow rate of water when washing a molded article having a flow channel such as a tube with running water is preferably 50 to 200 ml/min and more preferably 100 to 150 ml/min because a molded article, generation of particles from which is further suppressed, can be produced, and charging of the molded article can also be suppressed.

The production method of the present disclosure may comprise drying the washed molded article after the washing of the molded article with a chemical liquid and water is finished. The drying method is not limited, and may be spontaneous drying, spin drying, air blow drying, or suction drying. In particular, the drying method is preferably air blow drying in which droplets are blown off by clean air because drying is completed in a short period of time, and contamination due to drying can be suppressed. When drying a wafer carrier or a molded article having a complex shape, a clean-type vacuum dryer may be used.

The plasma-treated tube thus obtained is, for example, wound on a reel, and the wound tube is stored and transported.

The form of the molded article of the present disclosure and the molded article obtained by the production method of the present disclosure is not limited, and examples include a pellet, a film, a sheet, a plate, a rod, a block, a cylinder, a container, a rectangular tank, an electric wire, and a tube. Also, the molded article may be a fluororesin coating film for forming, for example, a coating layer for cooking utensils such as the inner pot of a rice cooker, a hot plate, and a frying pan, and a topcoat layer of a fixing roller for an image forming apparatus such as an electrophotographic or electrostatic recording copier and a laser printer. The fluororesin coating film can be formed by applying a fluororesin coating material to a substrate.

The molded article of the present disclosure and the molded article obtained by the production method of the present disclosure can be used in, but are not limited to, for example, the following applications:

a diaphragm part of a diaphragm pump, a molded bellows, an electric wire covering, a semiconductor component, a packing/seal, a thin-walled tube for a copy roll, a monofilament, a belt, a gasket, an optical lens component, a tube for oil excavation, a tube for geothermal powder generation, an electric wire for oil excavation, an electric wire for satellites, an electric wire for nuclear power generation, an electric wire for aircrafts, a solar panel film, a gasket for, for example, secondary batteries and electric double layer capacitors, and an OA roll.

The molded article can also be suitably used as, for example, a tube for circulating gas or a chemical liquid, a bottle for storing a chemical, a gas bag, a chemical liquid bag, a chemical liquid container, and a bag for frozen preservation.

The molded article can also be suitably used in a body or component of an on-off valve, a sleeve used when connecting a joint and a tube, a screw cap for a chemical liquid bottle and container, a gear, a screw, a frying pan, a pot, a rice cooker, a product obtained by coating a substrate such as metal with fluororesin, and a release film.

Particularly suitable applications of the molded article are perfluoro fluororesin components such as a piping of a chemical liquid supplying facility for semiconductor manufacture, and a tube, a joint, a valve, a tank, a container, a chemical liquid bag, and a wafer carrier for semiconductor manufacturing apparatuses.

It is also one preferable embodiment that the molded article of the present disclosure and the molded article obtained by the production method of the present disclosure are a tube.

In semiconductor plants, tubes are often used in distributing ultrapure water or high-purity chemical liquids for use in semiconductor manufacture. Gas such as nitrogen and oxygen, which are gaseous components in air, are dissolved in ultrapure water and high-purity chemical liquids. In the case where the inside of a tube has a negative pressure when ultrapure water or a high-purity chemical liquid flows, dissolved gas may form bubbles and be attached to the inner surface of the tube. In particular, when the chemical liquid is ammonia water, ozone water, aqueous hydrogen peroxide, or the like, bubbles are likely generated and attached to the inner surface. However, conventional tubes for chemical liquid piping such as PFA tubes used in semiconductor plants have an inner surface having a water contact angle exceeding 100 degrees and are thus problematic in that the tubes are unlikely wetted with water, and it is difficult to remove bubbles attached to the inner surface of the tubes. Accordingly, when using a new tube in a semiconductor plant, there is the problem that a large amount of ultrapure water or a chemical liquid is required or long-term washing is required to wash (flush) the inside of the tube.

Fine particles (particles) generated from a molded article containing a fluoropolymer such as a TFE/PAVE copolymer are hydrophobic. Accordingly, especially when an aqueous chemical liquid flows through a tube, fine particles are likely attached to the inner surface of the tube due to the interaction between the fine particles and the tube, and it is difficult to remove the attached fine particles by washing water such as pure water. Moreover, as described above, when bubbles are attached to the inner surface of the tube, it is even more difficult to remove the fine particles.

Since the inventive tube has the above-described configuration, bubbles and fine particles are unlikely attached to the tube, and even when bubbles and fine particles are attached, they can be easily removed by washing water. Since the tube provides such an effect, the tube is preferably a tube through which a chemical liquid flows, wherein the surface roughness Ra of a wetted surface is 0.20 μm or less, and the water contact angle of the wetted surface is 80 degrees or less.

The tube is preferably a tube for chemical liquid piping for circulating a chemical liquid. The chemical liquid may be a chemical liquid for use in semiconductor manufacture, and examples include aqueous chemical liquids such as ammonia water, ozone water, aqueous hydrogen peroxide, hydrochloric acid, and sulfuric acid.

It is also one preferable embodiment that the molded article of the present disclosure and the molded article obtained by the production method of the present disclosure are a wafer carrier. When washing a wafer held on a wafer carrier, bubbles and fine particles attached to the wafer carrier are problematic in that the fine particles cannot be easily removed, and the wafer is contaminated. Since the present wafer carrier has the above-described configuration, bubbles and fine particles are unlikely attached to the wafer carrier, and bubbles and fine particles even when they are attached can be easily removed by washing water.

It is also one preferable embodiment that the molded article of the present disclosure and the molded article obtained by the production method of the present disclosure are a nozzle component for a resist solution. When supplying a resist solution from a nozzle, bubbles and fine particles attached to a resist solution nozzle component are problematic in that the bubbles and fine particles enter the resist solution. Since the present resist solution nozzle component has the above-described configuration, bubbles and fine particles are unlikely attached to the nozzle component, and resist solution contamination can be suppressed. Also, air bubbles and fine particles, even when they are attached, can be easily removed by washing water in advance, and thus the purity of the resist solution can be easily maintained.

It is also one preferable embodiment that the molded article of the present disclosure and the molded article obtained by the production method of the present disclosure are a medical component such as a catheter. Since the present medical component has the above-described configuration, bubbles and biomaterials are unlikely attached to the medical component, and bubbles and biomaterials even when they are attached can be easily removed by washing water.

Embodiments have been described above, but it will be understood that various changes to forms and details can be made without departing from the gist and the scope of the claims.

EXAMPLES

Next, embodiments of the present disclosure will now be described by way of Examples, but the present disclosure is not limited solely to the Examples.

The numerical values of the Examples were measured by the following methods.

(Melting Point)

The melting point was obtained as a temperature corresponding to the maximum value in a heat-of-fusion curve obtained when the temperature was raised at a rate of 10° C./min using a differential scanning calorimeter [DSC].

(MFR)

The mass (g/10 min) of a polymer flowing out from a nozzle having an inner diameter of 2.1 mm and a length of 8 mm in 10 minutes using a melt indexer (manufactured by Yasuda Seiki Seisakusho Ltd.) at 372° C. under a load of 5 kg was obtained in accordance with ASTM D 1238.

(Content of Monomer Unit)

The content of each monomer unit was measured by $^{19}$F-NMR method.

(Number of Functional Groups)

A sample is melted at 330 to 340° C. for 30 minutes and compression-molded to create a film having a thickness of 0.25 to 0.3 mm. This film is analyzed by being scanned 40 times with a Fourier transform infrared spectrometer [FT-IR (trade name: Model 1760X manufactured by PerkinElmer Co., Ltd.)] to obtain an infrared absorption spectrum and obtain a spectral difference from a base spectrum of a completely fluorinated copolymer having no functional group. From the absorption peak of a specific functional group appearing in this spectral difference, the number N of functional groups per $1\times10^6$ carbon atoms in the sample is calculated according to the following formula (A).

$$N = I \times K / t \quad (A)$$

I: Absorbance
K: Correction coefficient
t: Film thickness (mm)

For reference, Table 2 shows the absorption frequencies, molar absorption coefficients, and correction coefficients of functional groups in the present disclosure. The molar adsorption coefficients are determined from the FT-IR measurement data of a low molecular weight model compound.

[Table 2]

TABLE 2

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF═CF$_2$ | 1795 | 635 | 366 | $CF_2$═$CF_2$ |

(Temperature of Surface of Molded Article)

The temperature was measured with a thermolabel manufactured by NiGK Corporation.

(Hardness and Ratio of Change in Hardness)

The indentation hardness (Hardness, unit: N/mm$^2$) of a surface was measured using a nanoindentation tester ENT-2100 manufactured by Elionix Inc. The measurement conditions included an indentation load of 80 μN, the number of measurements of 10 to 50, and a step interval of 20 ms, and the average value was calculated.

The ratio of change in hardness (=(Hardness after plasma treatment)/(Hardness before plasma treatment)) was calculated from the hardness of the molded article before and after plasma treatment.

(Water Contact Angle)

The water contact angle was measured at room temperature with a contact angle meter (FACE CONTACT ANGLE METER MODEL CA-D manufactured by Kyowa Interface Science Co., Ltd.).

The water contact angle of the molded article before plasma irradiation, the molded article one day after plasma irradiation, and the molded article 73 days after plasma irradiation was measured. When the molded article was a tube, each tube was cut to create a test piece, and the water contact angle of a portion of the test piece corresponding to the inner surface of a tube was measured.

(Surface Roughness Ra and Ratio of Change in Surface Roughness)

Using a surface roughness analyzer (SURFTEST SV-600 manufactured by Mitutoyo Corporation), measurement of 5 measurement points was repeated 3 times in accordance with JIS B 0601-1994, and the average value of the obtained measured values was regarded as the surface roughness Ra. When the molded article was a tube, each tube was cut to create a test piece, and the surface roughness Ra of a portion of the test piece corresponding to the inner surface of a tube was measured.

The ratio of change in surface roughness (=(Surface roughness Ra after plasma treatment)/(Surface roughness Ra before plasma treatment)) was calculated from the surface roughness Ra of the molded article before and after plasma treatment.

Comparative Example 1

TFE/PPVE copolymer 1 (composition ratio (% by mass) of TFE to PPVE: TFE/PPVE=96.5/3.5), melting point: 307° C., MFR: 2.0 g/10 min, number of functional groups: 6 (per $10^6$ C)) was molded with a tube extruder to obtain a tube having an outer diameter of 12 mm and an inner diameter of 10 mm. The physical properties of the obtained tube were evaluated. The results are shown in Table 3.

The obtained tube was inserted into double helix electrodes (a high frequency power source having 13.56 MHz) of an atmospheric pressure plasma treatment apparatus, a mixed gas of oxygen and argon (a volume ratio of oxygen to argon ($O_2$/Ar) of 1/100) was continuously introduced into the tube at a gas flow rate of 300 cc/min, power having a power density of 20 W/cm$^2$ was applied, and thus plasma treatment was performed for 300 seconds. The maximum temperature of the tube surface during the plasma treatment was 250° C. or higher.

Various physical properties of the tube after the plasma treatment were evaluated. The results are shown in Table 3.

Examples 1 to 3

Plasma treatment was performed in the same manner as in Comparative Example 1 except that the plasma treatment conditions were changed as shown in Table 3, and various physical properties of the tube after the plasma treatment were evaluated. The results are shown in Table 3.

Example 4

TFE/PPVE copolymer 2 (composition ratio (% by mass) of TFE to PPVE: TFE/PPVE=96.0/4.0), melting point: 306° C., MFR: 13.0 g/10 min, number of functional groups: 4 (per 10$^6$ C)) was molded with a heat-press molding machine to obtain a sheet having 50 mm per side and a thickness of 1 mm. The physical properties of the obtained sheet were evaluated. The results are shown in Table 3.

The obtained sheet was placed in an atmospheric pressure plasma treatment apparatus equipped with a pair of mutually parallel electrodes (a high frequency power source having 13.56 MHz), a mixed gas of oxygen and argon (a volume ratio of oxygen to argon ($O_2$/Ar) of 1/100) was continuously introduced into the treatment apparatus at a gas flow rate of 300 cc/min, power having a power density of 20 W/cm$^2$ was applied, and thus plasma treatment was performed for 20 seconds. The maximum temperature of the sheet surface during the plasma treatment was 190° C.

Various physical properties of the sheet after the plasma treatment were evaluated. The results are shown in Table 3.

Example 5

TFE/PPVE copolymer 3 (composition ratio (% by mass) of TFE to PPVE: TFE/PPVE=94.5/5.5, melting point: 301° C., MFR: 23.0 g/10 min, number of functional groups: 425 (per 10$^6$ C)) was molded with a heat-press molding machine to obtain a sheet having 50 mm per side and a thickness of 50 μm. The physical properties of the obtained sheet were evaluated. The results are shown in Table 3.

The obtained sheet was heated to 190° C. by an external heating means, then placed in a vacuum plasma treatment apparatus (a high frequency power source having 13.56 MHz) equipped with a pair of mutually parallel electrodes, ammonia gas was continuously introduced into the treatment apparatus at a gas flow rate of 20 cc/min such that the pressure in the treatment apparatus was maintained at 5.5 Pa, power having a power density of 20 W/cm$^2$ was applied, and thus plasma treatment was performed for 20 seconds.

Various physical properties of the sheet after the plasma treatment were evaluated. The results are shown in Table 3.

Examples 6 to 7

Plasma treatment was performed in the same manner as in Example 5 except that the plasma treatment conditions were changed as shown in Table 3, and various physical properties of the sheet after the plasma treatment were evaluated. The results are shown in Table 3.

In Comparative Example 1 and Examples 1 to 3, a tube having a length of 10 cm was used, and the entirety of the tube was irradiated with plasma, with the tube having a length of 10 cm being secured to the double helix electrodes. In Examples 4 to 7, the entirety of the prepared sheet was irradiated with plasma. Accordingly, the "treatment time (seconds)" of the plasma treatment in Table 3 is the time (seconds) of irradiating the entirety of the tube or sheet with plasma.

[Table 3]

TABLE 3

|  | Comparative Example 1 | Example 1 | Example 2 | Example 3 | Example 4 | Example 5 | Example 6 | Example 7 |
|---|---|---|---|---|---|---|---|---|
| Material used | Copolymer 1 | Copolymer 1 | Copolymer 1 | Copolymer 1 | Copolymer 2 | Copolymer 3 | Copolymer 3 | Copolymer 3 |
| Physical properties of molded article before plasma treatment | | | | | | | | |
| Hardness (MPa) | 83 | 83 | 83 | 83 | 85 | 76 | 76 | 76 |
| Water contact angle (degrees) | 104 | 104 | 104 | 104 | 105 | 103 | 103 | 103 |
| Surface roughness Ra (μm) | 0.132 | 0.132 | 0.132 | 0.132 | 0.102 | 0.100 | 0.100 | 0.100 |
| Plasma treatment conditions | | | | | | | | |
| Pressure | Atmospheric pressure | Atmospheric pressure | Atmospheric pressure | Atmospheric pressure | Atmospheric pressure | Vacuum | Vacuum | Vacuum |
| Type of electrode | Double helix electrodes | Double helix electrodes | Double helix electrodes | Double helix electrodes | Pair of parallel electrodes | Pair of parallel electrodes | Pair of parallel electrodes | Pair of parallel electrodes |
| Type of gas | $O_2$/Ar | $O_2$/Ar | $O_2$/Ar | $O_2$/Ar | $O_2$/Ar | $NH_3$ | $NH_3$ | $NH_3$ |
| Volume ratio of gas | 1/100 | 1/100 | 1/100 | 1/100 | 1/100 | — | — | — |
| Treatment time (seconds) | 300 | 10 | 45 | 20 | 20 | 20 | 30 | 40 |
| Surface temperature (° C.) | 250 or higher | 160 | 220 | 190 | 190 | 190 | 190 | 200 |
| Physical properties of molded article after plasma treatment | | | | | | | | |
| Hardness (MPa) | 115 | 110 | 105 | 120 | 125 | 95 | 97 | 98 |
| Ratio of change in hardness | 1.39 | 1.33 | 1.27 | 1.45 | 1.47 | 1.25 | 1.28 | 1.29 |
| Surface roughness Ra (μm) | 0.273 | 0.152 | 0.171 | 0.157 | 0.170 | 0.145 | 0.182 | 0.191 |
| Ratio of change in surface roughness | 2.07 | 1.15 | 1.30 | 1.19 | 1.67 | 1.45 | 1.82 | 1.91 |
| Water contact angle (degrees) 1 day after | 65 | 52 | 75 | 55 | 52 | 67 | 65 | 63 |
| Water contact angle (degrees) 73 days after | — | 55 | 80 | 57 | 55 | 70 | 68 | 65 |

Comparative Example 2

TFE/PPVE copolymer 4 (composition ratio (% by mass) of TFE to PPVE: TFE/PPVE=(96.3/3.7)), melting point: 306° C., MFR: 2.0 g/10 min, number of functional groups: 5 (per $10^6$ C)) was molded with a tube extruder to obtain an evaluation tube having a length of 5 m, an outer diameter of 6 mm, and an inner diameter of 4 mm. As for this evaluation tube, the number of particles having a size of 30 nmφ or more was measured according to the following method. The results are shown in Table 4.

Example 8

A tube obtained in the same manner as in Comparative Example 2 was inserted into double helix electrodes (a high frequency power source having 13.56 MHz) of an atmospheric pressure plasma treatment apparatus. A mixed gas of oxygen and argon (a volume ratio of oxygen to argon ($O_2$/Ar) of 1/100) was continuously introduced into the tube at a gas flow rate of 300 cc/min, and power having a power density of 20 W/$cm^2$ was applied. Thereafter, 5 m of the tube was irradiated with plasma while being moved at a treatment speed of 2 seconds/10 cm in the double helix electrodes having an effective plasma irradiation region of 10 cm. Plasma irradiation by this method was repeated 3 times to obtain an evaluation tube. The treatment time of the plasma treatment on the tube was a total of 6 seconds for any part of the tube. The surface of the tube during the plasma treatment was set such that the maximum temperature was 150° C. by auxiliary heating.

The water contact angle of the inner surface of the evaluation tube was 65 degrees. The number of particles having a size of 30 nmφ or more that flowed out from the evaluation tube was measured by the same method as in Comparative Example 2. The results are shown in Table 4.

Example 9

Plasma treatment was performed in the same manner as in Example 8 except that the plasma treatment was performed once at a treatment speed of 10 seconds/10 cm to obtain an evaluation tube. The treatment time of the plasma treatment on the tube was a total of 10 seconds for any part of the tube. The surface of the tube during the plasma treatment was set such that the maximum temperature was 150° C. by auxiliary heating. The water contact angle of the inner surface of the evaluation tube was 51 degrees. The number of particles having a size of 30 nmφ or more that flowed out from the evaluation tube was measured by the same method as in Comparative Example 2. The results are shown in Table 4.

(Number of Particles)

(1) Preparation of Isopropyl Alcohol

Commercially available high-purity isopropyl alcohol (IPA) was filtered using a 5 nmφ filter. Filtered IPA was left to stand for one day, and confirmed that the number of particles having a size of 30 nmφ or more was 30 particles/ml or less. IPA filtered in this way was used in washing the tube and measuring the number of particles.

(2) Measurement of Number of Particles

The evaluation tubes prepared in Comparative Example 2 and Examples 8 and 9 were connected to a particle counter shown in the FIGURE, and the tubes were filled with ultrapure water (UPW). Next, using a syringe pump, ultrapure water in the tubes was introduced into the particle counter (light scattering liquid-borne particle sensor KS-19F manufactured by Rion Co., Ltd.), and the number of particles was measured.

A while after the beginning of measurement, the maximum number of particles was measured, and then the number of particles measured gradually showed a downward trend. Table 4 shows the number of particles at the time when ultrapure water in an amount corresponding to one, three, four, and five times the inner volume of the tube was passed through the tube.

Next, ultrapure water in an amount corresponding to 15 times the internal volume of the tube was passed through the tube, and then the tube was filled with IPA. Using a syringe pump, IPA in the tube was introduced into the particle counter, and the number of particles having a size of 30 nmφ or more was measured. Table 4 shows the number of particles at the time when IPA in an amount corresponding to one, three, four, and five times the inner volume of the tube was passed through the tube.

The FIGURE is a drawing for explaining the method for measuring the number of particles.

In the FIGURE, a pipe 21 for supplying ultrapure water (UPW) and a pipe 31 for supplying isopropyl alcohol (IPA) are connected to the evaluation tube 11. Ultrapure water is supplied to the evaluation tube 11 via a filter 23 and a valve 22.

IPA is supplied as follows. Nitrogen gas 41 is supplied to a first chemical liquid container 36 to pressurize IPA 37 stored in the chemical liquid container 36. Pressurized IPA 37 flows through a filter 35 and is stored in a second chemical liquid container 33. IPA 34 in the second chemical liquid container 33 is left to stand for one day and then used in measurement. A pipe 31 is connected to the lower part of the second chemical liquid container 33, and the evaluation tube 11 is connected to the second chemical liquid container 33 via a valve 32.

A syringe pump 14 is provided on the downstream side of the particle counter 13 such that ultrapure water or IPA in the evaluation tube 11 can be introduced into the particle counter 13.

In order to prevent particles from entering ultrapure water and IPA due to opening/closing the valves 12, 22, and 32, diaphragm valves need to be used as the valves 12, 22, and 32.

Once a system for measuring the number of particles is configured in this way, ultrapure water is supplied from the pipe 21 to the evaluation tube 11 to fill the evaluation tube 11 with ultrapure water. After the evaluation tube 11 is filled with ultrapure water, the syringe pump 14 is operated to introduce ultrapure water in the evaluation tube 11 into the particle counter 14.

Once the measurement of the amount of particles with ultrapure water is completed, the valves 22 and 32 are opened/closed to switch the washing liquid from ultrapure water to IPA and thus fill the evaluation tube 11 with IPA. After the evaluation tube 11 is filled with IPA, the syringe pump 14 is operated to introduce IPA in the evaluation tube 11 into the particle counter 14. In the present disclosure, the number of particles is measured in this way.

TABLE 4

| | Water contact angle (degrees) | Surface roughness | | Number of particles (particles/ml) (Amount of washing liquid relative to inner volume of tube) | | | |
|---|---|---|---|---|---|---|---|
| | 1 day after | Ra (μm) | Washing method | 1-Fold amount | 3-Fold amount | 4-Fold amount | 5-Fold amount |
| Comparative Example 2 | 103 | 0.139 | UPW washing | 34,700 | 2,900 | 1,300 | 1,200 |
| | | | IPA washing | 7,000 | 5,200 | 230 | 20 |
| Example 8 | 65 | 0.131 | UPW washing | 93,800 | 70,800 | 15,000 | 9,800 |
| | | | IPA washing | 1,850 | 660 | 20 | 0 |
| Example 9 | 51 | 0.132 | UPW washing | 199,300 | 19,200 | 6,600 | 5,300 |
| | | | IPA washing | 550 | 10 | 20 | 0 |

As the results of Comparative Example 2 show, a large amount of particles flowed out from the tube that was not plasma-treated and had an excessively large surface roughness Ra and water contact angle when isopropyl alcohol (IPA) in an amount corresponding to four times the internal volume of the tube was passed through even after ultrapure water (UPW) in an amount corresponding to 20 times the internal volume of the tube was passed through the tube. Accordingly, it can be understood that particles cannot be sufficiently removed from the tube merely by washing the tube with ultrapure water.

On the other hand, in Examples 8 and 9, the number of particles detected when ultrapure water in an amount corresponding to 1 to 5 times the internal volume of the tube was passed through was very large, and thus a large amount of particles flowed out from immediately after the beginning of passing ultrapure water through the tube. Also, as the results of Example 8 show, only a small amount of particles flowed out, even when IPA was passed through, from the tube that was plasma-treated under suitable conditions and had a sufficiently small surface roughness Ra and water contact angle after ultrapure water in an amount corresponding to 20 times the internal volume of the tube was passed through the tube. Moreover, as the results of Example 9 show, only an extremely small amount of particles flowed out from the tube having a very small water contact angle after ultrapure water was passed through. Accordingly, it can be understood that merely by washing the tubes prepared in Examples 8 and 9 with ultrapure water, particles are sufficiently and promptly removed to such an extent that additional washing with a chemical liquid is nearly unnecessary.

The invention claimed is:

1. A molded article comprising a copolymer comprising a tetrafluoroethylene unit and a perfluoro(alkyl vinyl ether) unit, wherein a surface roughness Ra of the molded article is 0.20 μm or less, and a water contact angle of the molded article is 75 degrees or less.

2. The molded article according to claim 1, wherein a content of the perfluoro(alkyl vinyl ether) unit of the copolymer is 3.5 to 7.0% by mass based on all monomer units.

3. The molded article according to claim 1, wherein a melt flow rate of the copolymer at 372° C. is 1 to 30 g/10 min.

4. The molded article according to claim 1, which is a tube.

5. The molded article according to claim 1, which is a tube through which a chemical liquid is passed, wherein a surface roughness Ra of a wetted surface is 0.20 μm or less, and a water contact angle of the wetted surface is 75 degrees or less.

6. A method for producing the molded article according to claim 1,
the method comprising performing plasma treatment for a treatment time of 50 seconds or less on the molded article heated to a surface temperature of 150° C. or higher.

7. The method according to claim 6, wherein the plasma treatment is atmospheric pressure plasma treatment.

8. The method according to claim 6, wherein a content of the perfluoro(alkyl vinyl ether) unit of the copolymer is 3.5 to 7.0% by mass based on all monomer units.

9. The method according to claim 6, wherein a melt flow rate of the copolymer at 372° C. is 1 to 30 g/10 min.

10. The method according to claim 6, further comprising obtaining the molded article by extrusion.

11. The method according to claim 6, wherein the molded article is a tube.

12. The method according to claim 6, further comprising washing the molded article obtained by the plasma treatment with water.

13. A method for washing a molded article, comprising washing the molded article according to claim 1 with water.

* * * * *